US012049994B2

(12) United States Patent
Gao et al.

(10) Patent No.: US 12,049,994 B2
(45) Date of Patent: Jul. 30, 2024

(54) VEHICLE LIGHT EMITTING DEVICE WITH OPPOSED LIGHT REFLECTING FACES

(71) Applicant: VALEO VISION, Bobigny (FR)

(72) Inventors: Yagui Gao, Bobigny (FR); Can Tao, Bobigny (FR); Haiqing Zhou, Bobigny (FR); Ling Guo, Bobigny (FR); Yang Liu, Bobigny (FR); Chen Chen, Bobigny (FR); Pingwu Yang, Bobigny (FR); Chuyun Yao, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/000,399

(22) PCT Filed: Jun. 3, 2021

(86) PCT No.: PCT/EP2021/064957

§ 371 (c)(1),
(2) Date: Dec. 1, 2022

(87) PCT Pub. No.: WO2021/245211

PCT Pub. Date: Dec. 9, 2021

(65) Prior Publication Data

US 2023/0220971 A1 Jul. 13, 2023

(30) Foreign Application Priority Data

Jun. 4, 2020 (CN) ......................... 202010503084.6

(51) Int. Cl.
*F21S 43/16* (2018.01)
*F21S 43/14* (2018.01)
(Continued)

(52) U.S. Cl.
CPC ............... *F21S 43/33* (2018.01); *F21S 43/14* (2018.01); *F21S 43/15* (2018.01); *F21V 23/003* (2013.01)

(58) Field of Classification Search
CPC ........ F21S 41/435; F21S 41/365; F21S 43/16; F21S 43/30
See application file for complete search history.

(56) References Cited

U.S. PATENT DOCUMENTS 1,398,823 A * 11/1921 Wright .................... F21V 11/00 362/303
1,519,209 A * 12/1924 McElroy ................. F21S 41/36 362/346
2,469,412 A * 5/1949 Roebken .................. A61N 5/06 607/90
(Continued)

FOREIGN PATENT DOCUMENTS

CN 110736075 A 1/2020
EP 1 300 626 A2 4/2003
(Continued)

OTHER PUBLICATIONS

International Search Report issued Nov. 15, 2021 in PCT/EP2021/064957, filed on Jun. 3, 2021, 3 pages.

*Primary Examiner* — Ismael Negron
(74) *Attorney, Agent, or Firm* — Oblon, McClelland, Maier & Neustadt, L.L.P.

(57) ABSTRACT

A light-emitting device for a vehicle and has at least one light-emitting unit, the light-emitting unit including a light source and a reflective unit. The reflective unit includes a first reflective portion, having a first reflective face facing the light source; and a second reflective portion, having a second reflective face facing a light output region of the light-emitting unit The reflective unit further includes a bridging portion connecting the first reflective portion and the second reflective portion.

17 Claims, 3 Drawing Sheets

(51) Int. Cl.

| | |
|---|---|
| ***F21S 43/15*** | (2018.01) |
| ***F21S 43/33*** | (2018.01) |
| ***F21V 23/00*** | (2015.01) |

(56) References Cited

U.S. PATENT DOCUMENTS

| | | | | | |
|---|---|---|---|---|---|
| 3,054,888 | A * | 9/1962 | Yamashita | F21S 41/28 | 362/236 |
| 4,037,096 | A * | 7/1977 | Brendgord | F21V 7/0008 | 362/294 |
| 4,774,636 | A * | 9/1988 | Gaugel | F21S 41/435 | 362/519 |
| 5,278,731 | A * | 1/1994 | Davenport | F21S 41/321 | 362/258 |
| 5,582,480 | A * | 12/1996 | Zwick | F21S 43/31 | 362/329 |
| 6,558,032 | B2 * | 5/2003 | Kondo | F21S 43/40 | 362/346 |
| 6,637,921 | B2 * | 10/2003 | Coushaine | F21S 43/30 | 362/346 |
| 7,121,691 | B2 * | 10/2006 | Coushaine | F21V 29/70 | 362/346 |
| 7,416,322 | B2 * | 8/2008 | Tanaka | G02B 17/086 | 362/288 |
| 2003/0067784 | A1 | 4/2003 | Erber | | |
| 2008/0273345 | A1 * | 11/2008 | Yajima | B60Q 1/2665 | 362/517 |
| 2010/0290241 | A1 | 11/2010 | Tsukamoto | | |
| 2012/0081915 | A1 | 4/2012 | Foote et al. | | |
| 2015/0308650 | A1 | 10/2015 | De Kievit et al. | | |

FOREIGN PATENT DOCUMENTS

| | | | |
|---|---|---|---|
| EP | 2 251 592 | A2 | 11/2010 |
| JP | 50-54176 | | 5/1975 |
| JP | 2004-55168 | A | 2/2004 |
| JP | 4235992 | B2 | 3/2009 |
| WO | WO 2014/106599 | A1 | 7/2014 |

* cited by examiner

VEHICLE LIGHT EMITTING DEVICE WITH OPPOSED LIGHT REFLECTING FACES

TECHNICAL FIELD

The present invention relates to a light-emitting device and a vehicle.

BACKGROUND ART

Light-emitting diodes (LEDs) are widely used in the field of vehicles on account of having such characteristics as high brightness, an abundance of colour types, low power consumption and long life. However, when LEDs are used in a vehicle lamp, if the required illumination area is very large or the length of the illumination region is very long, a large number of LEDs are needed in order to achieve the desired light output effect, especially to meet requirements relating to light intensity and light distribution. This is obviously undesirable from a cost perspective. Furthermore, the greater the number of LEDs used, the higher the heat dissipation requirements will be, and the more problematic it will be to fit them precisely.

SUMMARY OF THE INVENTION

Thus, an object of the present invention is to propose a light-emitting device for a vehicle that is capable of at least partially solving the problem mentioned above.

According to the present invention, a light-emitting device for a vehicle is proposed, the light-emitting device having at least one light-emitting unit, the light-emitting unit comprising a light source and a reflective unit, the reflective unit comprising: a first reflective portion, having a first reflective face facing the light source; and a second reflective portion, having a second reflective face facing a light output region of the light-emitting unit, wherein the reflective unit further comprises a bridging portion connecting the first reflective portion and the second reflective portion. Preferably, the reflective unit is integrally formed. The width of a light beam of the light source is increased through reflection by the reflective faces, thereby reducing the number of light sources required. In addition, a desired light output requirement can be met merely by ensuring that the light source occupies the correct position, thereby simplifying the assembly process and manufacturing costs.

According to an embodiment of the present invention, the second reflective face comprises a first reflective sub-face and a second reflective sub-face, the first reflective sub-face being a light diffusing face for reflecting light reflected by the first reflective face, and the second reflective sub-face being a light collimating face for reflecting light coming from the light source. This combined structure enables easier blending of light.

According to an embodiment of the present invention, the first reflective face is a surface of revolution of an ellipse section, the ellipse section having a first focus and a second focus, with the light source being positioned at the first focus, and the second reflective sub-face is a surface of revolution of a parabola section, a focus of the parabola section coinciding with the first focus. This combination can increase the emission width and uniformity of light, such that fewer light sources are needed for a light-emitting device of a given length.

According to an embodiment of the present invention, a cross-sectional profile of the first reflective sub-face is a straight line or a hyperbola. With such a design, light reflected by the first reflective face reaches the first reflective sub-face after converging again, and the first reflective sub-face can achieve further diffusion of light, thereby increasing the uniformity of outputted light.

According to an embodiment of the present invention, the first reflective face and/or the second reflective face is a metal coating, e.g. an aluminium coating. For this purpose, a metal reflective layer can be applied after forming a base body forming a reflective structure, so as to achieve the required reflective effect.

According to an embodiment of the present invention, the reflective unit is formed of a light-reflecting PC (polycarbonate) plastic, and is preferably a white PC plastic. In this case, the reflective faces of the reflective unit can be formed directly from such a material, for example by injection moulding, with no need for further processing, thereby lowering costs.

According to an embodiment of the present invention, the second reflective face is provided with a light diffusion structure. For example, the light diffusion structure takes the form of protrusions, depressions or corrugations, etc. It is thus possible to achieve a better light diffusion effect—more precisely speaking, to enable light to be reflected diffusely, thereby achieving better uniformity of outputted light. The light diffusion structure may be arranged on at least one of the reflective sub-faces of the second reflective face.

According to an embodiment of the present invention, the light-emitting device has multiple light-emitting units, which are arranged in combination in a line or an array. This enables better adaptation to the required illumination area.

According to an embodiment of the present invention, the light-emitting units of the light-emitting device are at least partially arranged in an arc shape. This achieves better matching to the overall form of the vehicle on which the light-emitting device is mounted, or better matching to a mounting space of a support for the light-emitting device. Here, the expression "light-emitting units arranged in an arc shape" can for example be interpreted to mean that the relevant light sources, reflective units and light output regions, etc. can be regarded as being in an arc shape in space. Of course, they could also be arranged in a common plane.

According to an embodiment of the present invention, the corresponding light sources of the light-emitting units can be switched on and off in a controlled manner. This is especially suitable for cases where multiple light-emitting units are provided, so as to achieve a dynamic display effect, or illuminate a required region.

According to an embodiment of the present invention, the light source is a front-emitting or side-emitting light-emitting diode. Especially in the case where a side-emitting LED is used, it can be ensured that a light output surface occupies the optimal position relative to the reflective unit by changing the mounting angle of the side-emitting LED on a PCB, with no need for the PCB to be curved, thereby achieving simple assembly.

According to an embodiment of the present invention, the light-emitting device is a tail lamp. Examples are a brake lamp, a direction indicator lamp, etc.

According to another aspect of the present invention, a vehicle is also provided, having the light-emitting device described above.

BRIEF DESCRIPTION OF THE DRAWINGS

The present invention is expounded in greater detail below with the aid of the drawings. In the drawings.

DETAILED DESCRIPTION OF THE INVENTION

Embodiments of the present invention will be described demonstratively below. As those skilled in the art should realize, the embodiments described may be amended in various ways without departing from the concept of the present invention. Thus, the accompanying drawings and the Description are in essence demonstrative and non-limiting. In the following text, identical drawing reference labels generally indicate functionally identical or similar elements.

Figure 1:
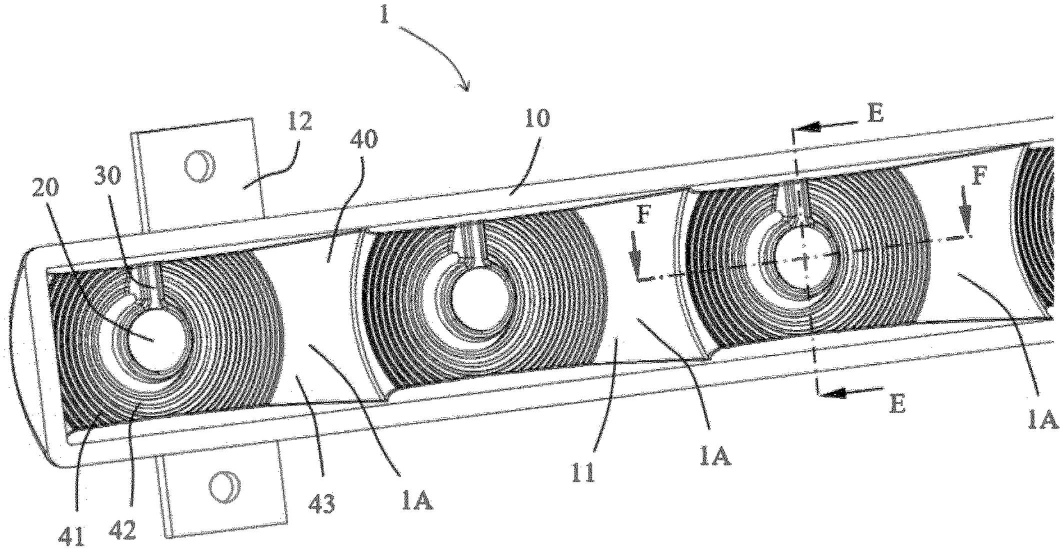
FIG. 1 shows schematically an embodiment of the light-emitting device according to the present invention.

FIG. 1 shows schematically an embodiment of a light-emitting device 1 according to the present invention. The light-emitting device 1 has multiple light-emitting units 1A, which have the same structure. In the example shown, the multiple light-emitting units 1A are arranged linearly. Of course, the light-emitting unit 1A may also have another manner of arrangement, e.g. an array arrangement, or a combined arrangement of a linear arrangement and an array arrangement, so as to match the form of the light output surface to be illuminated.

The light-emitting device 1 according to the present invention is now expounded with the aid of one light-emitting unit 1A.

As can be seen from FIGS. 1-4, the light-emitting unit 1A comprises a light source 52 and a reflective unit 11. The light source 52 has an optical axis A; the optical axis A corresponds to a main light output direction of the light source 52. The reflective unit 11 comprises: a first reflective portion 20, having a first reflective face 21 facing the light source 52; a second reflective portion 40, having a second reflective face 41 facing a light output region of the light-emitting unit 1A; and a bridging portion 30, which connects the first reflective portion 20 and second reflective portion 40. It can also be seen that the reflective unit 11 is integrally formed. The light-emitting device 1 is mounted on a support, not shown, by means of a mounting structure 12 formed on the reflective unit for example, e.g. is screw-connected or welded.

It should be explained that for the sake of clarity, only those constituent parts which are important for expounding the light-emitting device 1 are shown here. That is to say, the light-emitting device 1 also has other constituent parts, such as a lens that covers a light output region of the reflective unit 11, an electric drive unit, etc.

The second reflective portion 40 is constructed in a cup shape, and therefore has a bottom side 40A and an opening side 40B, wherein a hole is left at the bottom side 40A, with the light source 52 being disposed at the hole of the bottom side 40A. The light output region of the light-emitting unit 1A, i.e. of the light-emitting device 1, is also formed at the opening side 40B. An inner wall of the second reflective portion 40 forms the second reflective face 41.

The first reflective portion 20 extends out from the inner wall of the second reflective portion 40, in particular being connected to the inner wall via the bridging portion 30, such that the first reflective face 21 of the first reflective portion 20 occupies the correct position relative to the light source 52, e.g. is positioned directly in front of the light source 52 in the main light output direction of the light source 52.

Thus, in the light-emitting unit 1A, a portion of the light emitted by the light source 52 reaches the first reflective face 21 of the first reflective portion 20. In addition, a portion of the light emitted by the light source 52 reaches the second reflective face 41 of the second reflective portion 40. That is to say, the light emitted by the light source 52 propagates towards the light output region after reflection by the reflective unit 11. The first reflective face 21 is configured to reflect light towards the second reflective face 41 of the second reflective portion 40. Thus, in this way the illumination width is increased while ensuring good uniformity of outputted light, so that fewer light sources are needed for a light-emitting device of a given length.

Here, the first reflective face 21 of the first reflective portion 20 and the second reflective face 41 of the second reflective portion 40 are surfaces of revolution about the optical axis A, or a part thereof is formed in the abovementioned manner while the remainder may be designed according to actual needs, as can be seen especially clearly in FIG. 1. In FIG. 1, in particular, an upper part and a lower part of the second reflective face 41 of the second reflective portion 40 are flat surfaces.

In the example shown, the second reflective face 41 may comprise a first reflective sub-face 42 and a second reflective sub-face 43. Preferably, the first reflective sub-face 42 is a light diffusing face, and the second reflective sub-face 43 is a light collimating face; this enables easier blending of light, to guarantee the width and uniformity of outputted light. The first reflective sub-face 42 is arranged at the bottom side 40A of the inner wall of the cup-shaped second reflective portion 40 and receives light from the first reflective face 21; the second reflective sub-face 43 is arranged between the bottom side 40A and opening side 40B of the inner wall of the second reflective portion 40 and receives light from the light source 52. In other words, the second reflective sub-face 43 forms an inner circumferential sidewall of the cup-shaped second reflective portion 40. The first reflective face 21 is a surface of revolution of an ellipse section about the optical axis A, the ellipse section having a first focus F1 and a second focus F2, with the light source 52 being positioned at the first focus F1, and the second focus F2 being positioned between the first reflective face 21 and the first reflective sub-face 42. The second reflective sub-face 43 is a surface of revolution of a parabola section about the optical axis A, a focus of the parabola section coinciding with the first focus F1. The second reflective sub-face 43 directly receives a portion of the light emitted by the light source, and can thus convert incident light to parallel light which then propagates towards the light output region.

Here, the first reflective sub-face 42 and the first reflective face 21 are spaced apart in the main light output direction of the light source (see FIGS. 2 and 3), and are spatially positioned relative to each other in such a way that light reflected by the first reflective face 21 propagates towards the first reflective sub-face 42, and when being further reflected by the first reflective sub-face 42 towards the light output region, the further reflected light is not intercepted in the propagation path by the first reflective face 21, such that the light utilization rate is as high as possible. Preferably, the cross-sectional profile of the first reflective sub-face 42 is a straight line or a hyperbola; this can achieve an especially good diffusion effect.

The first reflective face 21 and/or the second reflective face 41 may be formed by a metal coating, e.g. an aluminium coating. In particular, the first reflective face 21 is a metal coating, to achieve as good a reflection effect as possible.

Alternatively, the reflective unit 11 is formed of a light-reflecting PC plastic, e.g. a white PC plastic. The first reflective face 21 and second reflective face 41 of the reflective unit 11 are formed directly from such a PC plastic. Such reflective material has been disclosed in the document CN105860483B for example. The porcelain white PC plastic starting material with brand number URZ2501, from the Japanese company Idemitsu Kosan, is also known on the market. It is possible to form the relevant reflective faces directly from such a material when forming the reflective unit 11 by injection moulding, with no need for further processing afterwards, thus simplifying the process.

Of course, in the case where the reflective unit 11 is formed of a light-reflecting PC plastic, it is likewise possible for the first reflective face 21 to be formed by a metal coating, such that light is guided to the light output region in cooperation with the second reflective face 41 formed from the PC plastic itself. This can similarly be helpful in increasing the uniformity of outputted light.

Figure 4:
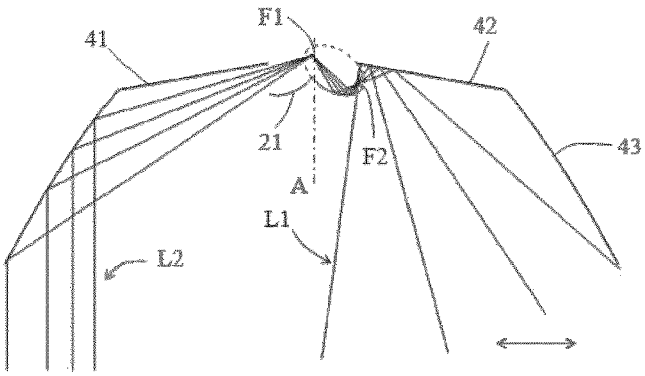
FIG. 4 shows schematically a diagram of a light path in one light-emitting unit of the light-emitting device in FIG. 1.

FIG. 4 shows a diagram of a light path in one light-emitting unit of the light-emitting device in FIG. 1. As can be seen, a portion of a conical light beam emitted by the light source forms a light beam L1 that diffuses in the directions of the double arrow after being reflected twice by the first reflective face 21 and the first reflective sub-face 42 of the second reflective face 41; another portion reaches the second reflective sub-face 43 of the second reflective face 41 directly, and forms a parallel light beam L2 after reflection. The light beams L1 and L2 substantially propagate in the main light output direction corresponding to the optical axis of the light source.

Figure 5:
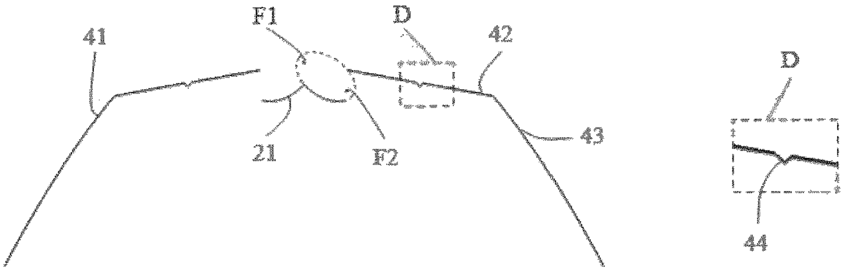
FIG. 5 shows schematically another embodiment of the light-emitting device according to the present invention.

FIG. 5 shows another embodiment of the light-emitting device according to the present invention. The main difference in this light-emitting device 1' is that the second reflective face 41 of the second reflective portion 40 is provided with a light diffusion structure 44. In the example shown, the light diffusion structure 44 is only arranged on the first reflective sub-face 42 of the second reflective face 41, and takes the form of annular protrusions, as can be seen in FIG. 1. The annular protrusions may be spaced apart or adjacent to each other. In FIG. 5, an enlarged drawing of a region D shows schematically that a single protrusion has a triangular cross section. Of course, the protrusion may also have other cross-sectional shapes, such as a section of an arc. The light diffusion structure may also take the form of corrugations or another suitable form. A better light diffusion effect is thereby ensured.

Alternatively, it is also possible for the light diffusion structure 44 to be arranged on the second reflective sub-face 43 of the second reflective face 41, or on the entire second reflective face 41.

Figure 6:
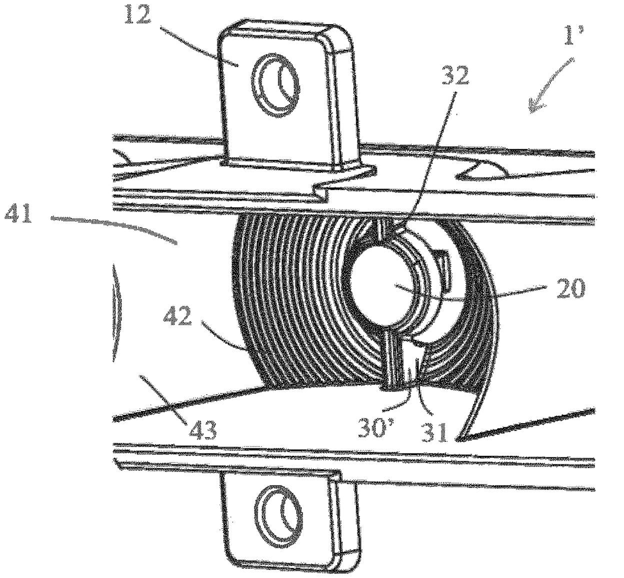
FIG. 6 shows schematically another embodiment of the light-emitting device according to the present invention.

FIG. 6 shows another embodiment of the light-emitting device according to the present invention. In this light-emitting device, the main difference is that the bridging portion 30' consists of two sections 31, 32. In the example shown, they are arranged opposite each other. Of course, it is also possible for a different number of sections to be provided. This is especially suitable for cases where the second reflective face 41 has a large size, and a more reliable connection between the two reflective portions is thereby achieved.

The light-emitting device 1 may have multiple said light-emitting units 1A, which are arranged in combination in a line or an array, in order to suit the required illumination region. For this purpose, a corresponding number of light sources 52 such as LEDs is needed; these are arranged on a PCB 51, thereby forming a light-emitting assembly 50. In this case, the corresponding light sources 52 of the light-emitting units 1A can be switched on and off in a controlled manner by means of a controller, thereby achieving a dynamic display effect for example, or illuminating a required region.

When the overall longitudinal length of the light-emitting device 1 is very long, the light-emitting assembly 50 can be divided into multiple parts connected together electrically.

Figure 2:
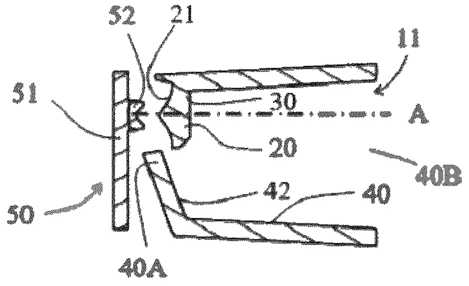
FIG. 2 shows a drawing of a section, taken along line E-E in FIG. 1, of one light-emitting unit of the light-emitting device.
Figure 3:
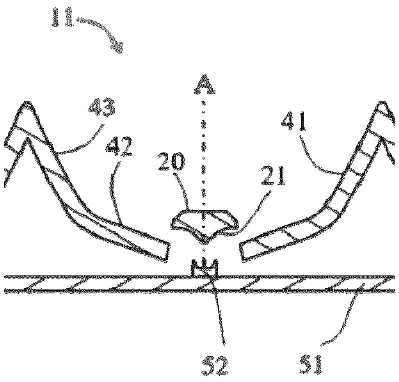
FIG. 3 shows a drawing of a section, taken along line F-F in FIG. 1, of one light-emitting unit of the light-emitting device.
Figure 7:
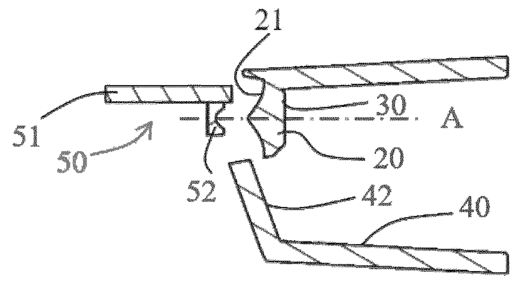
FIG. 7 shows schematically another embodiment of the light-emitting device according to the present invention.

The light source 52 may be a front-emitting or side-emitting LED, see FIGS. 2 and 7. In particular when the light-emitting units 1A are arranged in an arc shape, and especially when they are arranged in an arc shape in a common plane, side-emitting LEDs can be used. This makes it possible to match the arc-shaped course of the light-emitting units of the light-emitting device 1 by mounting the LEDs at different angles on a common PCB, without the need for the PCB to be curved, and this can reduce stress in the PCB.

The light-emitting device 1 may be a tail lamp for a vehicle, in particular a tail light bar. In particular, the light-emitting device 1 may be used for a brake lamp, direction indicator lamp, etc.

The present invention, instead of being limited to the above-described structure, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. Light-emitting device, comprising:
at least one light-emitting unit, the light-emitting unit comprising a light source and a reflective unit,
wherein the reflective unit comprises
a first reflective portion, having a first reflective face facing the light source; and
a second reflective portion, having a second reflective face facing a light output region of the light-emitting unit,
wherein the reflective unit is integrally formed,
wherein the second reflective face comprises
a first reflective sub-face that is a light diffusing face for reflecting light reflected by the first reflective face, and
a second reflective sub-face that is a light collimating face for reflecting light coming from the light source,
wherein the first reflective face is a surface of revolution of an ellipse section, the ellipse section having a first focus and a second focus, with the light source being positioned at the first focus, and the second reflective sub-face is a surface of revolution of a parabola section, a focus of the parabola section coinciding with the first focus.

2. Light-emitting device according to claim 1, wherein a cross-sectional profile of the first reflective sub-face is a straight line or a hyperbola.

3. Light-emitting device according to claim 1, wherein at least one of the first reflective face or the second reflective face is a metal coating.

4. Light-emitting device according to claim 1, wherein the second reflective face is provided with a light diffusion structure.

5. Light-emitting device according to claim 1, wherein the light source is a front-emitting or side-emitting LED.

6. Light-emitting device according to claim 1, wherein the light-emitting device is a tail lamp.

7. Vehicle comprising the light-emitting device according to Cairn 1.

8. Light-emitting device according to claim 1, wherein the reflective unit is formed of a light-reflecting PC plastic.

9. Light-emitting device according to claim 8, wherein the PC plastic is white.

10. Light-emitting device according to claim 1, wherein the light-emitting device has multiple said light-emitting units, which are arranged in combination in a line or an array.

11. Light-emitting device according to claim 10, wherein the light-emitting units are at least partially arranged in an arc shape.

12. Light-emitting device according to claim 10, wherein the corresponding light sources of the light-emitting units are configured to be switched on and off in a controlled manner to achieve a dynamic display effect or illuminate a required region.

13. Light-emitting device according to claim 1, wherein the reflective unit further comprises a bridging portion connecting the first reflective portion and the second reflective portion.

14. Light-emitting device according to claim 13, wherein at least one of the first reflective face and/or or the second reflective face is a metal coating.

15. Light-emitting device according to claim 13, wherein the reflective unit is formed of a light-reflecting PC plastic.

16. Light-emitting device according to claim 13, wherein the second reflective face is provided with a light diffusion structure.

17. Light-emitting device according to claim 13, wherein the light-emitting device has multiple said light-emitting units, which are arranged in combination in a line or an array.

* * * * *